Nov. 10, 1964 R. R. KEESEE 3,156,599
METHOD AND APPARATUS FOR MANUFACTURING CARDBOARD MOLDING
Filed Sept. 7, 1960 6 Sheets-Sheet 1
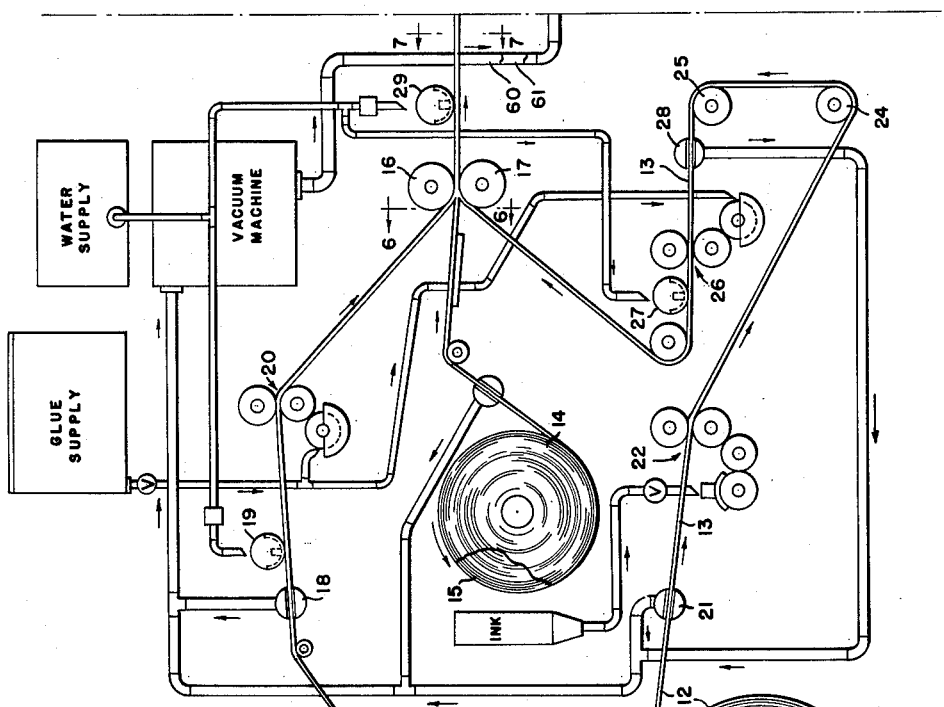
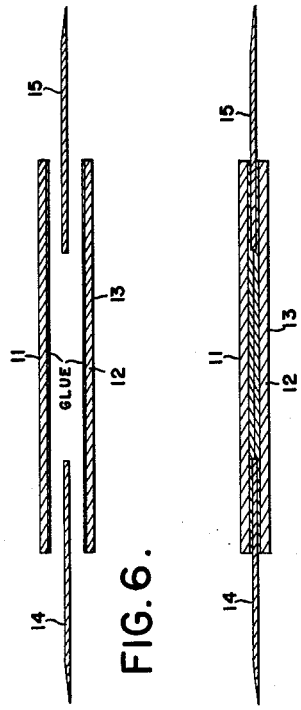
FIG. 1a.
FIG. 6.
FIG. 7.
INVENTOR
ROLAND R. KEESEE
BY
ATTORNEY

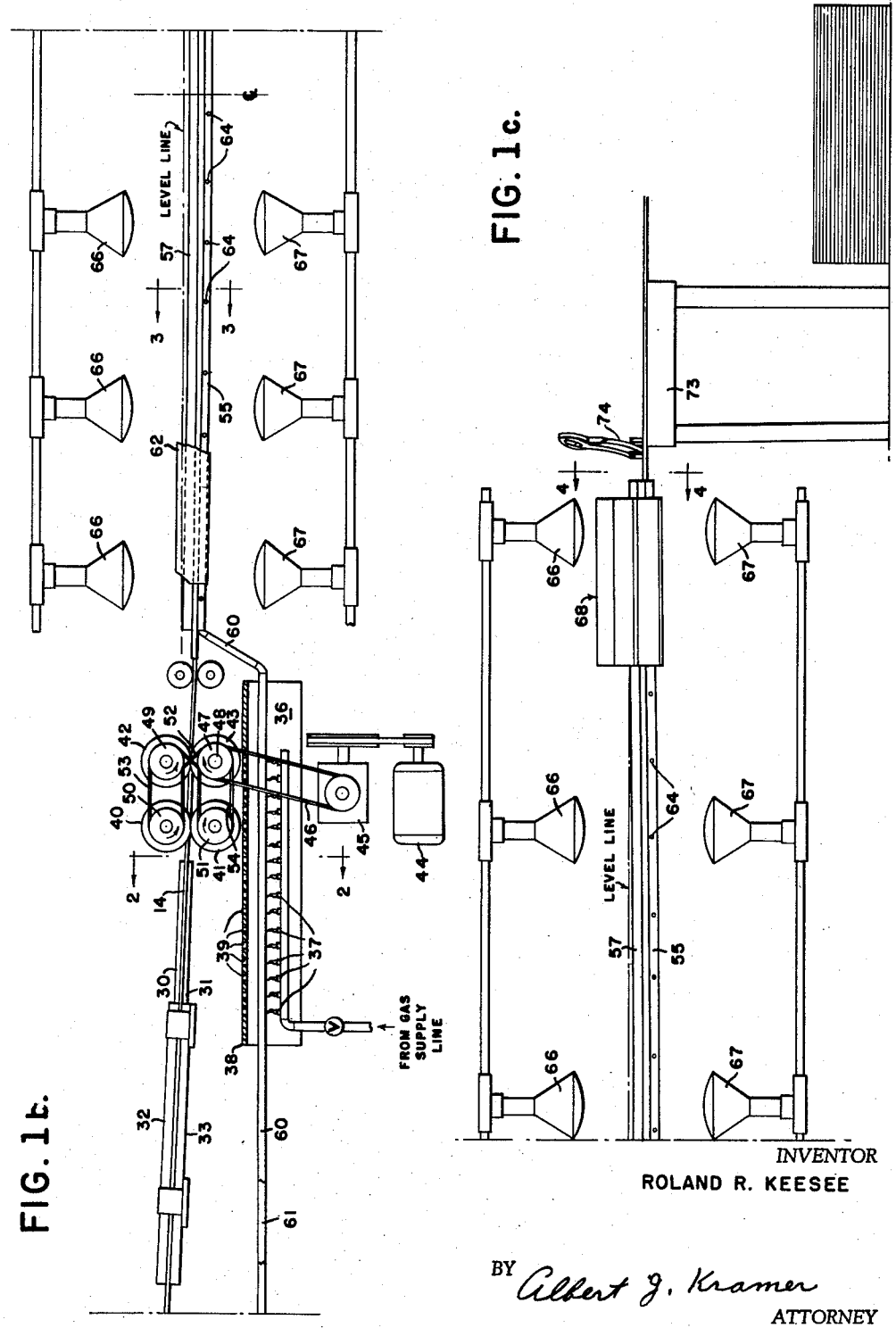

Nov. 10, 1964   R. R. KEESEE   3,156,599
METHOD AND APPARATUS FOR MANUFACTURING CARDBOARD MOLDING
Filed Sept. 7, 1960   6 Sheets-Sheet 3
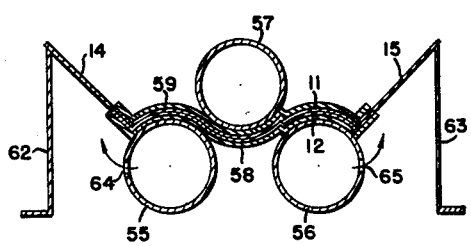
FIG. 2.
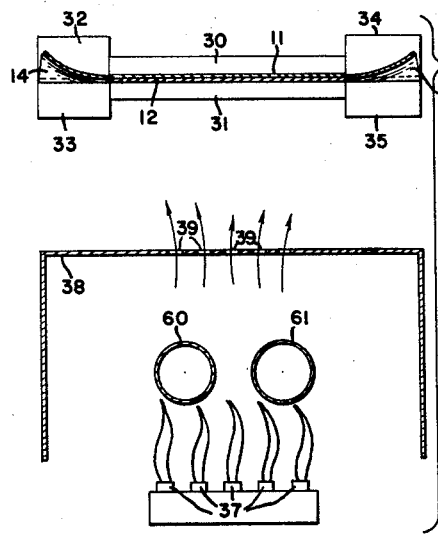
FIG. 3.
FIG. 4.
FIG. 5.
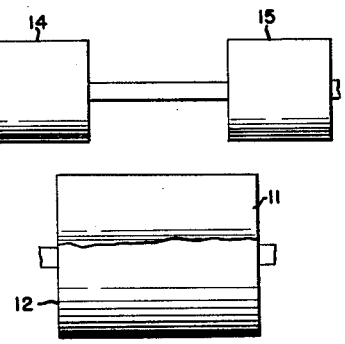
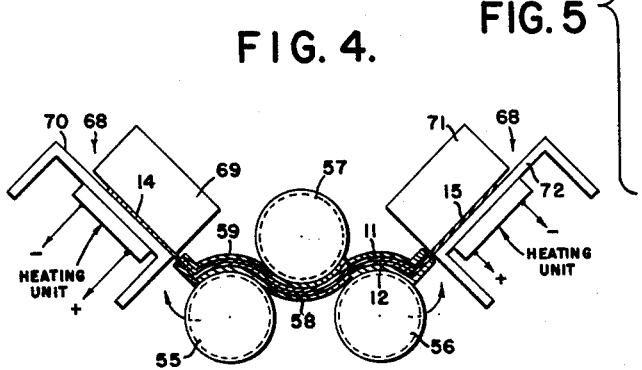
FIG. 8.
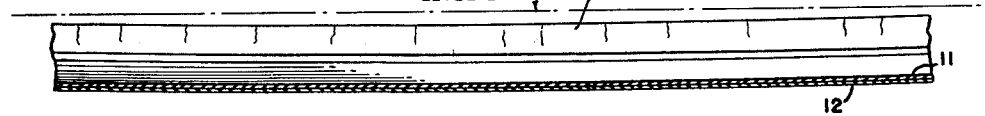
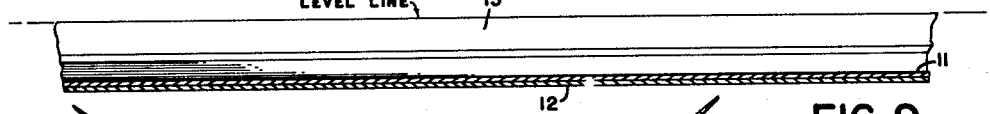
FIG. 9.
FIG. 10.
INVENTOR
ROLAND R. KEESEE
BY Albert J. Kramer
ATTORNEY

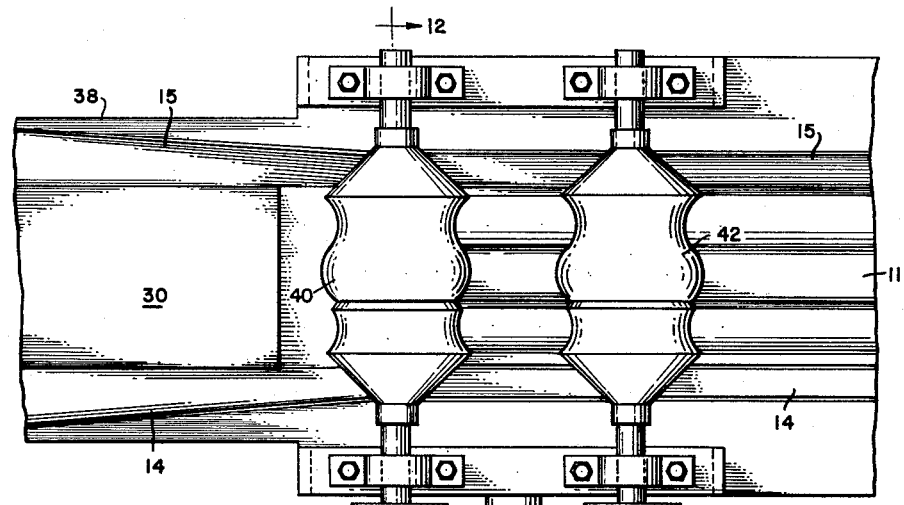
FIG. 11.
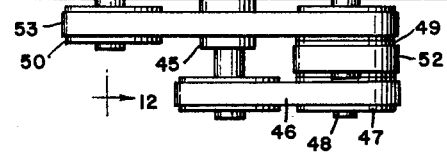
FIG. 12.
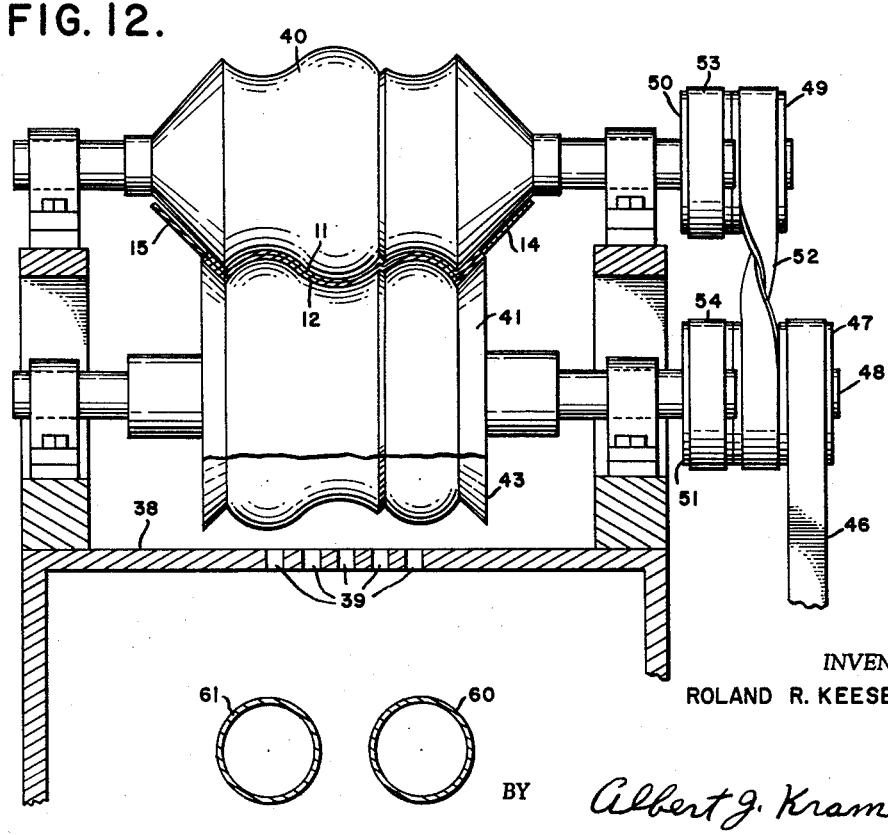
INVENTOR
ROLAND R. KEESEE
BY Albert J. Kramer
ATTORNEY INVENTOR
ROLAND R. KEESEE
BY
Albert J. Kramer
ATTORNEY Nov. 10, 1964         R. R. KEESEE         3,156,599
METHOD AND APPARATUS FOR MANUFACTURING CARDBOARD MOLDING
Filed Sept. 7, 1960                    6 Sheets-Sheet 6

INVENTOR
ROLAND R. KEESEE

BY *Albert J. Kramer*
ATTORNEY

United States Patent Office 3,156,599
Patented Nov. 10, 1964

3,156,599
METHOD AND APPARATUS FOR MANUFACTURING CARDBOARD MOLDING
Roland R. Keesee, 275 Plainview Circle,
North Little Rock, Ark.
Filed Sept. 7, 1960, Ser. No. 56,089
18 Claims. (Cl. 156—196)

This invention relates to cardboard molding for use on the interior of buildings and it is more particularly concerned with the manufacture of such moldings.

An object of the invention is the provision of a method for manufacturing a cardboard molding having a stiff cardboard center strip and attaching flaps along the longitudinal edges thereof for use in securing the molding in position.

Another object of the invention is the provision of apparatus for carrying out the method of manufacture.

A further object of the invention is the provision of a method and apparatus for carrying out the method by virtue of which the flaps are rendered smooth and wrinkle free.

A still further object of the invention is the provision of such a method and apparatus by virtue of which the manufacturing is carried out in a continuous manner.

These and still further objects and advantages of the invention will appear more fully from the following description, considered together with the accompanying drawing, illustrating an embodiment of the invention.

In the drawing:

FIGS. 1a, 1b and 1c are longitudinal portions of a schematic diagram, illustrating the arrangement of apparatus for carrying out the various steps of the method of the invention.

FIG. 2 is a cross-sectional view along the line 2—2 of FIG. 1b.

FIG. 3 is a cross-sectional view along the line 3—3 of FIG. 1b.

FIG. 4 is a cross-sectional view along the line 4—4 of FIG. 1c.

FIG. 5 is a schematic plan view showing the general relative positioning of the rolls of flap tapes with respect to one of the rolls of cardboard.

FIG. 6 is a schematic cross-sectional view, generally along the line 6—6 of FIG. 1a, showing the relative position of the strips of cardboard and flap tapes before gluing.

FIG. 7 is a view similar to FIG. 6 after assembly of the strips, as it would appear along the line 7—7 of FIG. 1a.

FIG. 8 is a longitudinal sectional view illustrating on an enlarged scale the camber provided just prior to the pressing operation.

FIG. 9 is a view similar to FIG. 8 of the same portion, after the pressing operation.

FIG. 10 is a cross-sectional view of the finished product.

FIG. 11 is a top plan view of a portion of the embodiment on a larger scale showing the top pressure rollers and the paper material passing through the rollers.

FIG. 12 is a section along the line 12—12 of FIG. 11.

Figure 13:
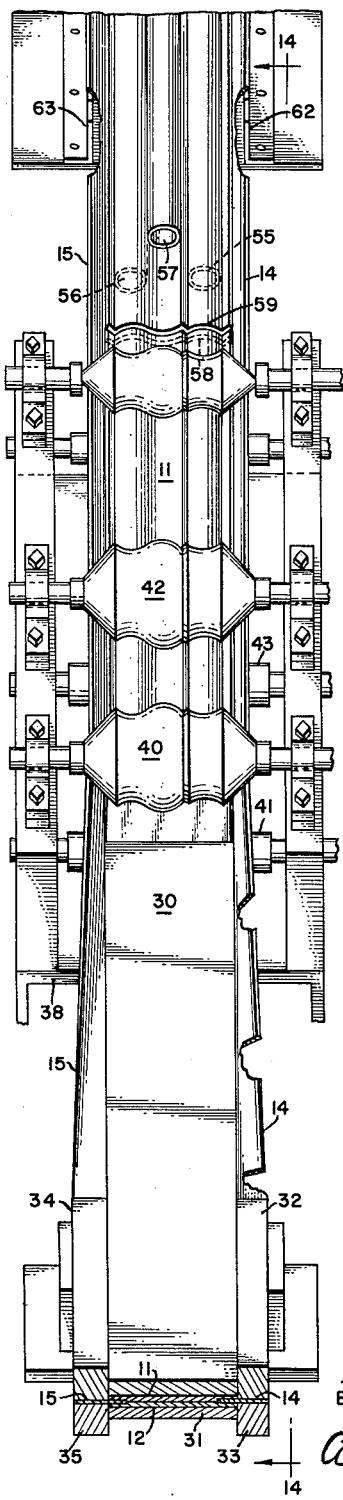
FIG. 13 is a perspective view of a larger section of the embodiment with parts broken away taken from the rear and looking forwardly, in conjunction with the strip and flaps passing through the plates and rollers, one of the strips being partly cut away at several points to clarify its orientation.
Figures 14, 15:
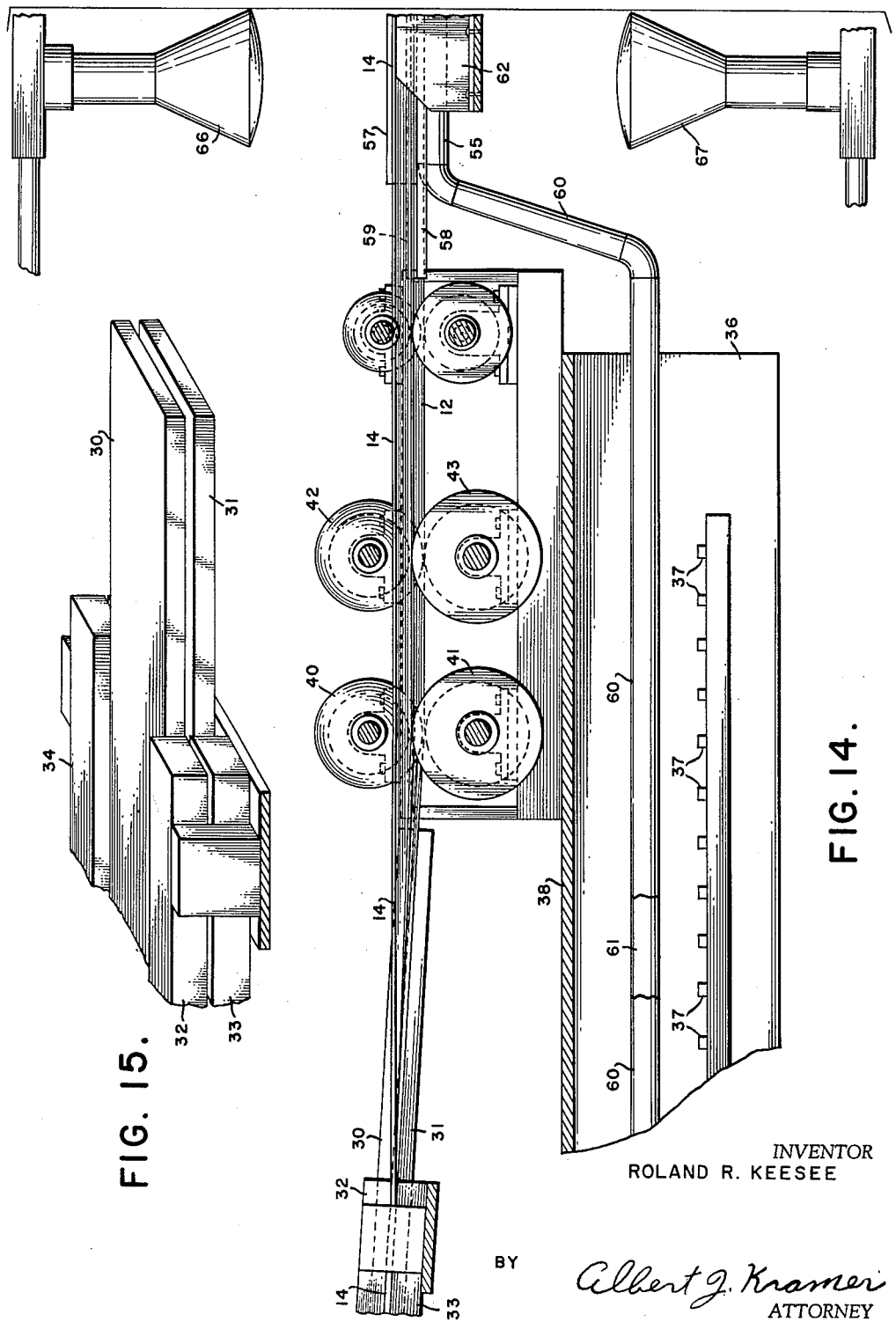
FIG. 14 is a side elevational view along the line 14—14 of FIG. 13.
FIG. 15 is a perspective view of a fragmentary portion of the machine.

In accordance with this invention, the starting materials comprise a first roll of a strip of cardboard 11, a second roll of a strip of cardboard 12, one side 13 of which is calendered to provide a smooth surface, and two rolls of relatively thin tape strips of porous paper 14 and 15 to form the securing flaps. These strips are fed to a pair of juncture rollers 16, 17 in the relative position illustrated by FIG. 6.

From the roll of cardboard 11 to the juncture rollers 16, 17 the first strip of cardboard passes through a vacuum cleaning station 18 to remove dust and chips which normally break loose from the cardboard and which must be removed to prevent interference with the gluing operations and to provide an even glue joint. At a water applicator station 19 the outer side of the strip is aqueously moistened, that is, water is applied to the outer side of the strip and at a glue applicator station 20 glue is applied to the inside of the strip 11. The water may include a conventional wetting agent, such as sodium lauryl sulfate, to assist the wetting action.

From the roll of cardboard 12, to the juncture rollers 16, 17, the second strip of cardboard passes through a vacuum cleaning station 21 and a printing station 22. The station 21 is similar to and is provided for the same purpose as station 18. The station 22 is for the purpose of adding any printed indicia to the calendered surface 13, such as, guide lines (not shown) for mitre cuts. The position of the strip is then reversed by means of rollers 24 and 25 to bring the calendered surface 13 on top for the application of glue at glue station 26 to the bottom side of the strip, which is to form the inner side of the finished product, and water at the water station 27 to the top side of strip which is to comprise the outer side of the strip in the completed article. An additional vacuum cleaning station 28 is also provided immediately preceding the glue station 26, to remove any final dust and chips immediately before the glue is applied.

The printing station may be dispensed with where printing is not to be applied. Subsequent distortion of the strip makes it difficult to apply printing, unless it is applied prior to the molding operation.

After passing through the juncture rollers 16, 17, water is supplied to the flaps 14 and 15 by an applicator 29. The strips of cardboard and the strips of tape so positioned relative to each other are passed through downwardly sloping guides consisting of a central pair of spaced upper and lower plates 30 and 33, respectively, for the cardboard strips, and spaced outer plates 32, 33 and 34, 35 for the tape strips or flaps 14 and 15, respectively.

The plates 30 and 31 extend to the drive and forming rollers 40-41 and pass over a heater 36 for the purpose of heating the water that has been applied to and absorbed in the strips in order to plasticize the material preparatory to the molding operation. The heater includes a group of gas burners 37 and a hood 38 having openings 39 therein for the escape of heated air.

The outer plates 32, 33 and 34, 35 terminate at about the beginning of the heater, at a substantial distance from the forming rollers 40, 41, thereby releasing the flaps from these plates so that they can be gradually turned upwardly under the influence of forces acting against the bottom thereof as they pass through the rollers and slide over the edge of the walls 62 and 63 hereinafter described. Between the ends of the plates 32, 33 and the upper edge of the wall 62 the flap 14 is gradually twisted from a horizontal position (see FIG. 2) to an angular position as shown in FIG. 3. Similarly, between the plates 34, 35 and the walls 63 the flap 15 is gradually twisted from its horizontal position to the angular position shown in FIG. 3. Thus, releasing of the flaps avoids tension therein during the molding operation. The upward turning of the flaps is caused by the forming rollers acting on the center strips 11 and 12 exclusively. By releasing the flaps a substantial distance from the forming rollers, tension that would otherwise result therein from an abrupt change of direction is mitigated because of the more gradual change permitted.

The molding operation is effected in two steps by two sets of rolls with complementary configurative surfaces for molding decorative shapes. A first set 40, 41 provides a preliminary or initial molding under relatively less pressure and the second set 42, 43 constitutes the finishing rolls whereby the final molding operation is performed. These molding rolls are driven by a motor 44, through a speed reducer 45 by means of the belts and pulleys shown. The belt 46 connects the speed reducer to a pulley 47 on shaft 48 of the roll 43. The shafts of the other rolls have similar pulleys 49, 50 and 51 interconnected by the belts 52, 53 and 54.

These roll sets also constitute the drive for moving the material through the apparatus.

Leaving the roll sets, the material moves through a dryer which comprises a group of tubes 55, 56 and 57 supporting a pair of plates 58 and 59 spaced apart an amount sufficient to permit the passage therebetween of the composite strip and conforming to the contour imparted by said roll sets. The tubes 55, 56 and 57 together with the plates 58 and 59 have a longitudinal bottom camber (downward arch) for the purpose explained hereinafter and which causes the strip passing between these plates to conform to this camber (see FIG. 8).

The tubes 55, 56 and 57 are supplied with hot air from the exhaust end of the vacuum machine (see FIG. 1a) through pipes 60 and 61 which pass through the heater 36.

The outer edges of the flaps 14 and 15 are maintained in a dovetail position by resting on the top edges of vertical side plates or walls 62 and 63 running alongside the tubes 55, 56 and 57. The bottom tubes 55 and 56 are provided with openings 64 and 65, respectively, along the exterior to permit the hot air to escape against the underside of the flaps 14 and 15 as they slide along the walls 62 and 63. Additional heat is supplied by infra-red heating lamps 66 and 67 above and below.

Irregularities in the surface of the flaps which may develop from shrinkage during the forming and drying steps are subsequently overcome as the flaps proceed through the dryer under the conditions of the arching effected by the bottom camber and from the composite strip being subsequently de-arched, that is, restored to the straight condition and finally passed through the dryer and through the irons of the pressing unit hereinafter described. This straightening or de-arching results in a tensioning of the flaps which permits them to be pressed smoothly and evenly. This constitutes an important feature of the invention because, unless the flaps are substantially even and free of irregularities, they cannot be properly applied to the building structure.

The flaps contain a small amount of moisture as they leave the dryer and enter a pressing unit 68. This pressing unit comprises two sets of pressing irons, namely, a pair of top and bottom pressing irons 69, 70 for the flap 14 and a pair of top and bottom irons 71, 72 for the other flap 15. The flaps slide between these irons and are pressed smooth thereby.

The finished product leaves the pressing unit and can then be cut into any desired lengths for storage and handling such as by a suitable cutting means at a cutting station symbolized by the cutting table 73 and cutter 74.

Having thus described my invention, I claim:

1. The method of forming a molding strip comprising securing a continuous paper flap to each longitudinal edge of a relatively stiff cardboard strip, said flaps being disposed in overlapping relation to the respective margins of the strips and extending outwardly therefrom, aqueously moistening the strip and flaps and heating the strip until it becomes relatively soft, molding the strip while soft to a decorative shape, bending the flaps inwardly, each along a longitudinal line adjacent to its respective longitudinal edge of the strip, reducing water in the strip while the flaps are in the bent position to restore stiffness therein, and pressing the flaps to a smooth surface finish.

2. The method of forming a molding strip comprising securing a continuous paper flap to each longitudinal edge of a relatively stiff cardboard strip, said flaps being disposed in overlapping relation to the respective margins of the strips and extending outwardly therefrom, aqueously moistening the strip and flaps and heating the strip until it becomes relatively soft, molding the strip while it is in the said soft state and in a normally straight position longitudinally, to a decorative shape, arching the strip longitudinally from its normally straight position and bending the flaps inwardly, each along a longitudinal line adjacent to its respective longitudinal edge of the strip to a diagnoal position on the concave side of the strip, then reducing water in the strip to restore stiffness therein while the flaps are in the angular position, and then pressing the flaps to a smooth surface finish.

3. The method of forming a molding strip comprising securing a continuous paper flap to each longitudinal edge of a relatively stiff cardboard strip, said flaps being disposed in overlapping relation to the respective margins of the strips and extending outwardly therefrom, aqueously moistening the strip and flaps and heating the strip until it becomes relatively soft, molding the strip while it is in said relatively soft state and in a normally straight position longitudinally, to a decorative shape, arching the strip longitudinally from its normally straight position and bending said flaps inwardly on the concave side of the strip together with marginal portions of the strip along longitudinal lines, then reducing water in the strip to restore stiffness thereto while the flaps are in the angular position, and then pressing the flaps to a smooth surface finish.

4. The method as defined by claim 2 in which the cardboard strip comprises at least two plies of cardboard glued to each other and to marginal edges of the paper flaps, said flaps being disposed between the said plies.

5. Apparatus for forming a molding strip comprising means for securing a continuous paper flap to each longitudinal edge of a stiff cardboard strip, means for aqueously moistening the strip and flaps and heating the strip to render it soft, means for molding the soft strip to a desired decorative shape, means for arching the molded strip longitudinally from a normally straight position and simultaneously bending the flaps inwardly on the concave side of the arched strip along longitudinal lines, means for reducing water in the strip to restore its stiffness, and means for pressing the flaps to a smooth surface finish.

6. Apparatus for forming a molding strip comprising means for continuously gluing together two plies of stiff cardboard and two paper tapes to form a two-ply composite cardboard strip with the tapes extending outwardly therefrom as flaps, means for continuously aqueously moistening and heating the composite strip until it becomes relatively soft, means for continuously molding the composite strip to provide a decorative shape, means for arching the molded strip longitudinally from a normally straight position and for simultaneously bending the flaps inwardly on the concave side of the arched strip along longitudinal lines, means for reducing water in the arched strip to restore its stiffness, and means for pressing the flaps to a smooth surface finish.

7. Apparatus as defined by claim 6 in which the means for molding the strip comprises a set of pressure rollers between which the composite strip passes, said rollers having complementary configurations in accordance with the desired design.

8. Apparatus as defined by claim 6 in which the means for reducing water in the composite arched strip comprises a group of longitudinal tubes in contact with the strip, means for passing heated air through the tubes and means for diverting some of the air passing through the tubes to flow against the flaps.

9. The method of manufacturing a molding having a central cardboard section and flaps extending outwardly from the longitudinal edges thereof, comprising arranging two elongated plies of stiff cardboard, one above the other, and two relatively thin strips of paper tape between said cardboard plies in overlapping relation with the longitudinal margins thereof, respectively, applying an adhesive to the inner surface of the plies and aqueously moistening them from the opposite outer surfaces thereof, bringing the inner surfaces of the plies together with the lapping edges of the tape strips therebetween to form a double ply composite cardboard strip with the tapes extending therefrom as flaps, aqueously moistening the exposed portions of the flaps, molding the composite cardboard strip to form therein a three dimensional decorative design, arching the cardboard strip longitudinally from a normally straight position and bending the flaps inwardly on lines, while drying the strips and flaps, then restoring the strip to its normally straight position to place the flaps under tension and pressing the flaps while so tensioned.

10. The method of forming a molding strip comprising securing a continuous paper flap to each longitudinal edge of a stiff cardboard strip, aqueously moistening and softening the strip and aqueously moistening the flaps, molding the softened strip to a decorative shape and then drying the strip to stiffen it and drying and pressing the flaps to a smooth surface finish.

11. The method of forming a molding strip comprising securing a continuous paper flap to each longitudinal edge of a cardboard strip, aqueously moistening and softening the strip and aqueously moistening the flaps, molding the softened strip to a decorative shape and then drying the strip to restore its stiffness and drying and pressing the flaps to a smooth surface finish.

12. The method of forming a molding strip comprising securing a continuous paper flap to each longitudinal edge of a stiff cardboard strip, aqueously moistening and softening the strip and aqueously moistening the flaps, molding the softened strip to a decorative shape, arching the molded strip longitudinally from a normally straight position and bending the flaps inwardly relative to the strip on the concave side of the arched strip, drying the strip and flaps in the arched position, restoring the strip to its normally straight position to tension the flaps and pressing the flaps while so tensioned to a smooth surface finish.

13. Apparatus for forming a molding strip comprising means for securing a continuous paper flap to each longitudinal edge of a cardboard strip, means for aqueously moistening the strip and flaps and heating the strip to soften it, means for molding the softened strip to a desired decorative shape, and means for drying the strip to restore its stiffness, and means for pressing the flaps to a smooth finish.

14. Apparatus for forming a molding strip comprising means for securing a continuous paper flap to each longitudinal edge of a cardboard strip, means for aqueously moistening the strip and flaps and heating the strip to soften it, means for molding the softened strip to a desired decorative shape, means for reducing water in the strip to restore its stiffness, and means for pressing the flaps to a smooth surface finish.

15. Apparatus for forming a molding strip comprising means for securing a continuous paper flap to each longitudinal edge of a stiff cardboard strip, means for aqueously moistening the strip and flaps and heating the strip to soften it, means for molding the softened strip to a desired decorative shape, means for arching the strip longitudinally from a normally straight position and bending the flaps inwardly on the concave side of the arched strip along longitudinal lines, means for drying the strip to restore its stiffness, means for restoring the strip to its normally straight position to tension the flaps longitudinally, and means for pressing the flaps while so tensioned to a smooth surface finish.

16. The method of manufacturing a molding having a central cardboard section and flaps extending from the longitudinal edges thereof comprising arranging two elongated plies of cardboard, one above the other, and two relatively thin strips of paper tape between said cardboard plies in overlapping relation with the longitudinal margins thereof, respectively, applying an adhesive to the inner surfaces of the plies and aqueously moistening them from the opposite outer surfaces thereof, bringing the inner surfaces of the plies together with the lapping edges of the tapes therebetween to form a double ply cardboard composite strip with the tapes extending therefrom as flaps, aqueously wetting the exposed portions of the flaps, molding the composite strip to form therein a three-dimensional decorative design and then drying the strip and flaps and pressing the flaps to a smooth surface finish.

17. The method of manufacturing a molding having a central cardboard section and flaps extending from the longitudinal edges thereof comprising arranging two elongated plies of cardboard, one above the other, and two relatively thin strips of paper tape between said cardboard plies in overlapping relation with the longitudinal margins thereof, respectively, applying an adhesive to the inner surfaces of the plies and aqueously moistening them from the opposite outer surfaces thereof to soften them, bringing the inner surfaces of the plies together with the lapping edges of the tape strips therebetween to form a double ply cardboard composite strip with the tapes extending therefrom as flaps, aqueously wetting the exposed portions of the flaps, molding the composite strip to form therein a three-dimensional decorative design and then drying the strip to restore stiffness to the plies thereof and drying and pressing the flaps.

18. The method of manufacturing a molding having a central cardboard section and flaps extending from the longitudinal edges thereof comprising arranging two elongated plies of relatively stiff cardboard, one above the other, and two relatively thin strips of paper tape between said cardboard plies in overlapping relation with the longitudinal margins thereof, respectively, applying an adhesive to the inner surfaces of the plies and aqueously moistening them from the opposite surfaces thereof to soften them, bringing the inner surfaces of the plies together with the lapping edges of the tape strips therebetween to form a double ply cardboard composite strip with the tapes extending outwardly therefrom as flaps, aqueously moistening the exposed portions of the flaps, molding the softened composite strip to form therein a three-dimensional decorative design, arching the molded strip longitudinally from a normally straight position and bending the flaps inwardly relative to the strip on the concave side thereof, drying the strip to restore its stiffness and also drying the flaps, restoring the strip to its normally straight position to tension the flaps longitudinally, and then pressing the flaps while so tensioned.

References Cited in the file of this patent
UNITED STATES PATENTS

| | | |
|---|---|---|
| 269,816 | Hamilton | Dec. 26, 1882 |
| 1,719,947 | Swift, Jr. | July 9, 1929 |
| 1,734,321 | Youngblood | Nov. 5, 1929 |
| 2,234,701 | Lyman | Mar. 11, 1941 |
| 2,273,554 | Bannon | Feb. 17, 1942 |
| 2,405,528 | Skolnik | Aug. 6, 1946 |
| 2,479,891 | Adshead | Aug. 23, 1949 |
| 2,553,227 | Wesner | May 15, 1951 |
| 2,622,680 | Yakubik | Dec. 23, 1952 |
| 2,649,890 | Dunlap et al. | Aug. 25, 1953 |
| 2,665,735 | Steffenino | Jan. 12, 1954 |
| 2,758,739 | Burkholder | Aug. 14, 1956 |
| 2,779,979 | Sunderlin | Feb. 5, 1957 |
| 2,794,761 | Williamson | June 4, 1957 |